United States Patent
Jones

(10) Patent No.: US 6,804,086 B2
(45) Date of Patent: Oct. 12, 2004

(54) UNITARY CRYSTALLINE SLIDER WITH EDGES ROUNDED BY LASER ABLATION

(76) Inventor: Gordon M. Jones, 1393 Camelback Dr., Eagan, MN (US) 55123

( * ) Notice: Subject to any disclaimer, the term of this patent is extended or adjusted under 35 U.S.C. 154(b) by 164 days.

(21) Appl. No.: 09/843,213

(22) Filed: Apr. 25, 2001

(65) Prior Publication Data

US 2001/0034564 A1 Oct. 25, 2001

Related U.S. Application Data

(60) Provisional application No. 60/200,724, filed on Apr. 27, 2000.

(51) Int. Cl.$^7$ .......................... G11B 5/60; G11B 15/64; G11B 17/32; G11B 21/20
(52) U.S. Cl. .................................................... 360/236.7
(58) Field of Search .......................... 360/236.7, 236.4, 360/236.5, 235.4, 234.3, 234, 230

(56) References Cited

U.S. PATENT DOCUMENTS

| | | | |
|---|---|---|---|
| 4,635,403 A | 1/1987 | Makino et al. ............. 51/94 R |
| 4,746,895 A | 5/1988 | Kato et al. .................. 338/272 |
| 4,783,225 A | 11/1988 | Maejima et al. ........... 148/33.2 |
| 5,189,278 A | 2/1993 | Frietsch ................. 219/212.66 |
| 5,230,747 A | 7/1993 | Maejima et al. ........... 148/33.2 |
| 5,279,992 A | 1/1994 | Maejima et al. ............. 437/229 |
| 5,416,656 A | * 5/1995 | Fukuda et al. ........... 360/235.4 |
| 5,591,320 A | 1/1997 | Rolander .................... 205/664 |
| 5,654,850 A | * 8/1997 | Ganapathi et al. .......... 360/122 |
| 5,771,763 A | 6/1998 | Näslund et al. .............. 82/1.11 |
| 5,822,153 A | * 10/1998 | Lairson et al. ........... 360/234.7 |
| 5,944,587 A | 8/1999 | Stadtfeld ..................... 451/59 |
| 5,993,638 A | 11/1999 | Rolander .................... 205/664 |
| 5,997,755 A | * 12/1999 | Sawada ....................... 216/22 |
| 6,040,959 A | * 3/2000 | Kobayashi et al. ...... 360/235.9 |
| 6,069,769 A | * 5/2000 | Dorius et al. ............. 360/235.6 |
| 6,178,068 B1 | * 1/2001 | Sugimoto ................ 360/236.5 |
| 6,219,200 B1 | * 4/2001 | Waki et al. ................. 360/122 |
| 6,278,582 B1 | * 8/2001 | Okawa et al. ........... 360/235.2 |
| 2001/0030835 A1 | * 10/2001 | Hipwell et al. ............. 360/237 |
| 2001/0043559 A1 | * 11/2001 | Schaenzer et al. .......... 369/300 |
| 2002/0033558 A1 | 3/2002 | Fahey et al. ................ 264/400 |
| 2002/0039256 A1 | * 4/2002 | Polycarpou et al. ...... 360/236.7 |
| 2002/0089787 A1 | * 7/2002 | Lu et al. ................... 360/235.1 |

* cited by examiner

Primary Examiner—Julie Anne Watko
(74) Attorney, Agent, or Firm—Westman, Champlin & Kelly P.A.

(57) ABSTRACT

A curved surface is formed between first and second a substantially planar surfaces that are normal to each other, such as the bottom and side surfaces of a slider for a disc drive. A laser beam has a center with a focus and a power distribution, such as a Gaussian distribution, such that the laser power is greatest at the center of the beam and is weaker radially from the center of the beam. The laser beam is directed at the first surface along a first path substantially normal to the first surface so that a center of the laser beam is substantially contiguous to the second surface. The laser beam is moved along a second path substantially parallel to the second surface to ablate the slider at the first surface adjacent the second surface to ablate the material and form a continuous curved surface between and tangential to the first and second surfaces. Optionally, the laser beam is moved along a third path substantially contiguous to the third surface to form a second continuous curved surface between and tangential to the first and third surfaces.

20 Claims, 8 Drawing Sheets

UNITARY CRYSTALLINE SLIDER WITH EDGES ROUNDED BY LASER ABLATION

CROSS-REFERENCE TO RELATED APPLICATION

This application claims priority of U.S. Provisional Application No. 60/200,724 filed Apr. 27, 2000 by Gordon M. Jones for "Ceramic Edge Rounding Through Laser Ablation".

FIELD OF THE INVENTION

This invention relates to rounding edges on objects, and particularly to rounding edges on aerodynamic sliders for disc storage drives during manufacturing such sliders.

BACKGROUND OF THE INVENTION

Sliders and sliders containing magnetic heads are typically manufactured by thin-film techniques such that several thousands of sliders or slider/head combinations are formed from a single substrate or wafer. The wafer is sliced into row bars, and each row bar is mounted to a mount bar by an adhesive. The row bar is lapped smooth to form an air bearing surface for each slider on the bar, and the slider features, including rails and transducing heads, are defined on the bars. The bars are then diced into individual sliders for subsequent assembly into disc drives.

Dicing is accomplished by cutting the bar at predetermined dice lanes between sliders using a diamond cutting blade. The dicing operation creates sharp edges at the junctions of the side surfaces with the other surfaces of the slider (i.e., the bottom, trailing, leading and top surfaces). Sharp edges might also be present at the junctions of the leading and trailing surfaces to the other surfaces due to the slicing operating forming the row bars. The bottom surface of the slider is either a substantially planar air-bearing surface or is a substantially planar nominal surface from which rails containing the air-bearing surface protrude. The sides are substantially planar surfaces that are normal to the bottom surface and to the leading and trailing surfaces; the side surfaces being formed by the diamond cutting blade when the bar is diced. The trailing surface ordinarily includes the transducing head features. The junctions of the various surfaces form 90° edges of the slider. Additionally, sharp corners are formed at the junctions of any three of these surfaces.

These edges and corners, particularly those between the side and bottom surfaces and the trailing and leading surfaces, can damage the confronting data disc in the event of a head crash or other landings of the slider on the disc. Moreover, a risk exists that material from the slider will break loose from the edges and corners during operation of the disc drive, forming debris that adversely affects performance of the slider and/or the drive. The debris may collect in the rail structure of the slider, adversely affecting the flying characteristics of the slider. The debris might also collect on the disc, adversely affecting the smoothness of the disc surface, and hence the flying characteristics of the slider over the disc. The debris can also physically damage the read/write transducer, thereby adversely affecting the recording and readback characteristics of the disc drive. The risk that debris will break loose from the slider increases where the slider is constructed of a ceramic or other crystalline material. In such cases, less than 75%, and often less than 50%, of the facets of the microscopic crystals of slider material at the sharp edges and corners are bonded to adjacent crystals, resulting in weaker crystalline bonds at the edges and corners and increasing the risk that crystals will break off from the slider to form debris.

Numerous techniques have been employed to minimize the sharp edges and corners on sliders. One technique is to form chamfer across the edges and corners. However, a 45° chamfer surface between the side and bottom surfaces will form sharp edges at the 45° junction between the chamfer surface and each of the bottom and side surfaces. While the reduction of the angle at the edges due to the chamfer increases crystalline bond strength along the edges, thereby reducing the risk of material breaking off to form debris, the 45° angle is still sharp enough that the risk of forming debris still exists. Consequently, there is a need to further reduce or eliminate edge angles.

Prior attempts to round the edges between the bottom surface and side surface have not been successful. More particularly, attempts at rounding the edges employed rounded cutting saws or wire saws. Misalignment of the saw to the edge of the slider resulted in imprecise cutting of the edges, usually resulting in one or both of the bottom and side surfaces being cut more deeply or more shallow than intended. As a result, sharp edges were created by the cutting process between the misaligned curved surface and the bottom and/or side surface. Additionally, the profile of the rounded edge was often concave, not convex. Also, wear of the saw resulted in inconsistent shapes of the rounded edges. Further, the rounded surface should have a small radius, usually less than about 15 microns, which is difficult to achieve with mechanical knives and saws.

There is a need for a technique of accurately forming a continuous curved edge surface in a slider such that the curved surface tangentially meets the side and bottom surfaces of a slider without the formation of sharp edges. The present invention provides a solution to this and other problems, and offers other advantages over the prior art.

SUMMARY OF THE INVENTION

One embodiment of the present invention is a process of forming a curved surface between first and second substantially planar and substantially normal surfaces on an object, such as a slider. A laser beam has a power distribution such that the laser power is greatest at the center of the beam and is weaker radially from the center of the beam. The laser beam is directed substantially normal to the first surface so that the center of the laser beam is contiguous the second surface. The laser beam is moved along a path substantially parallel to the second surface to ablate the object at the first surface adjacent the second surface. The power distribution provides peak power at the center of the beam, contiguous the second surface, with a power profile that decreases to the fringe of the distribution. Consequently, ablation of the material forms a continuous curved surface, generally in the shape of a cylinder, that extends between and tangential to at least one, and preferably both, the first and second surfaces.

In preferred embodiments, the power distribution is a Gaussian distribution whose power profile decreases substantially exponentially from the center of the beam to the fringe.

In some embodiments, the object includes a substantially planar third surface normal to the first and second surfaces. The laser beam is moved along a path parallel to the third surface to ablate the object adjacent the third surface to thereby form a second continuous curved surface between and tangential to the first and third surfaces.

In some embodiments, the object is a slider, characterized by a first continuously curved surface extending between and tangentially joined to the bottom and side surfaces and a second continuously curved surface between and tangentially joined to the bottom and trailing surface.

In yet other embodiments, a computer readable medium contains a computer readable program containing code that causes the computer to carry out the process of the invention.

Other features and benefits that characterize the present invention will be apparent upon reading the following detailed description and review of the associated drawings.

DETAILED DESCRIPTION OF ILLUSTRATIVE EMBODIMENTS

The present invention is directed to rounding the edges of an object using a laser beam having a varying power distribution that diminishes from a high power at the center of the beam to a low power distal from the center. While the invention will be described in connection with rounding edges of a ceramic slider for a disc drive, it is equally useful for rounding edges of other objects, as well as objects fabricated of materials other than ceramic. For example, the invention may be used to round edges of devices such as integrated circuit chips, optical lenses, precision metal parts and the like, as well as holders for receiving and transporting such devices.

Figure 1:
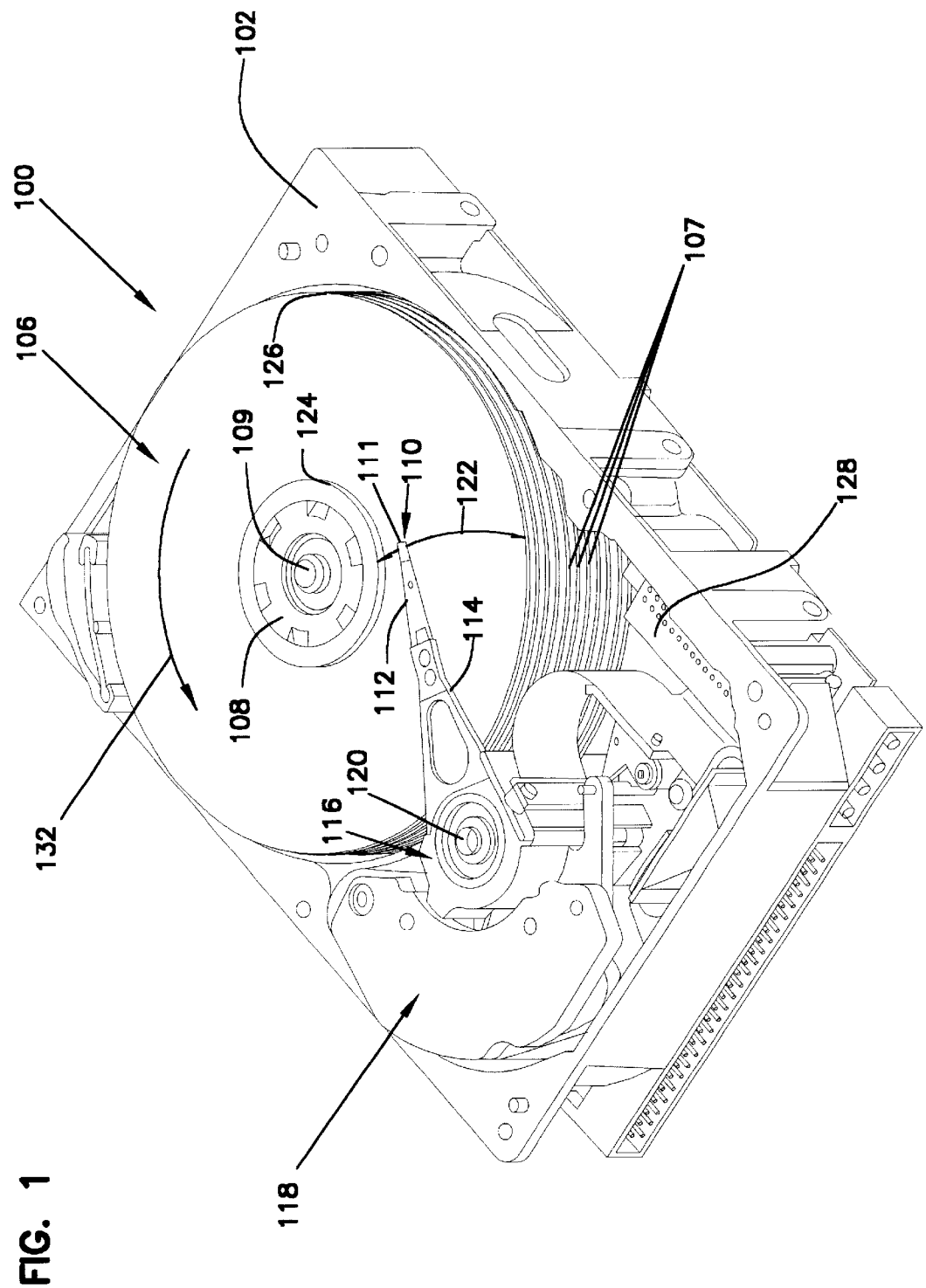
FIG. 1 is a perspective view of a disc drive in which aspects of the present invention may be practiced.

FIG. 1 is a perspective view of a disc drive 100 that may employ a slider whose edges have been rounded according to the present invention. Disc drive 100 includes a housing with a base 102 and a top cover (not shown). Disc drive 100 further includes a disc pack 106, which is mounted on a spindle motor (not shown), by a disc clamp 108. Disc pack 106 includes a plurality of individual discs 107, which are mounted for co-rotation about central axis 109. Each disc surface has an associated disc head-slider 110 that is mounted to disc drive 100 for communication with the confronting disc surface. Head-slider 110 includes a slider structure arranged to fly above the associated disc surface of an individual disc of disc pack 106, and a transducing head 111 arranged to write data to, and read data from, concentric tracks on the confronting disc surface. In the example shown in FIG. 1, head-sliders 110 are supported by suspensions 112 which are in turn attached to track accessing arms 114 of an actuator 116. Actuator 116 is driven by a voice coil motor (VCM) 118 to rotate the actuator, and its attached heads 110, about a pivot shaft 120. Rotation of actuator 116 moves the heads along an arcuate path 122 to position the heads over a desired data track between a disc inner diameter 124 and a disc outer diameter 126. Voice coil motor 118 is driven by servo electronics included on circuit board 130 based on signals generated by the heads of head-sliders 110 and a host computer (not shown). Read and write electronics are also included on circuit board 130 to supply signals to the host computer based on data read from disc pack 106 by the read heads of head-sliders 110, and to supply write signals to the write head of head-sliders 110 to write data to the discs.

FIGS. 2–7 are section views of a bar 20 containing a plurality of sliders 22 and 24, illustrating the process of forming curved edges in accordance with a first embodiment of the present invention. Each slider 22 and 24 comprises a unitary crystalline body formed from a wafer and having a plurality of rails 26 protruding from nominal surface 28, each rail defining an air bearing surface 30 for confronting a recording disc, such as a disc 107 in FIG. 1. While the present invention will be described in connection with sliders having rails 26 offset from the sides of the slider, the rails and air bearing surfaces may be contiguous to the side surfaces, in which case nominal surface 28 adjacent the side surfaces is the air bearing surface.

Figure 3:
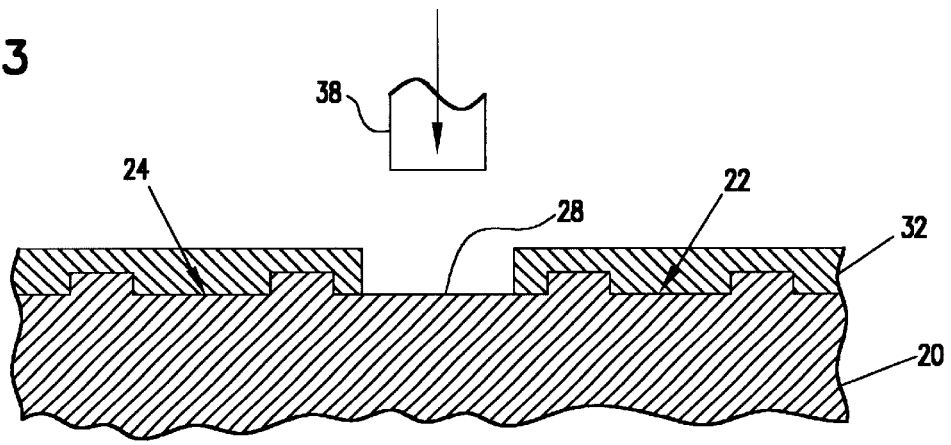
Figure 4:
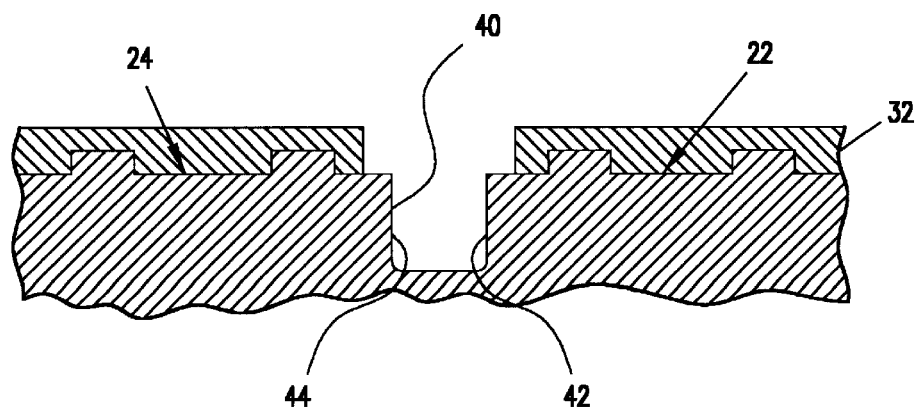

In a first embodiment of the invention, a photoresist 32 is applied to the sliders, and a photolithographic mask 34 is formed over photoresist 32. Mask 34 includes a region 36 of high transparency forming an opening or aperture through which light may pass. Region 36 in mask 34 is wider than a dice lane to be formed between sliders 22 and 24. Light is directed through region 36 of mask 34 to expose and develop a portion of photoresist 32. As shown in FIG. 3, the exposed photoresist is washed away, leaving a portion of surface 28 exposed which is wider than the dice lane between sliders 22 and 24. Cutting saw, or dicing wheel, 38 cuts a scribe line in the form of channel 40 into surface 28 to a predetermined depth normal to surface 28 (FIG. 4). The scribe line is defines the dice lane along which the sliders will be diced and separated. As shown in FIGS. 3 and 4, channel 40 does not occupy the entire exposed area of surface 28 exposed through photoresist 32. The scribe line of channel 40 forms surfaces 42 and 44 normal to surface 28 with sharp edges at the junctions of surface 28 to surfaces 42 and 44.

Figure 5:
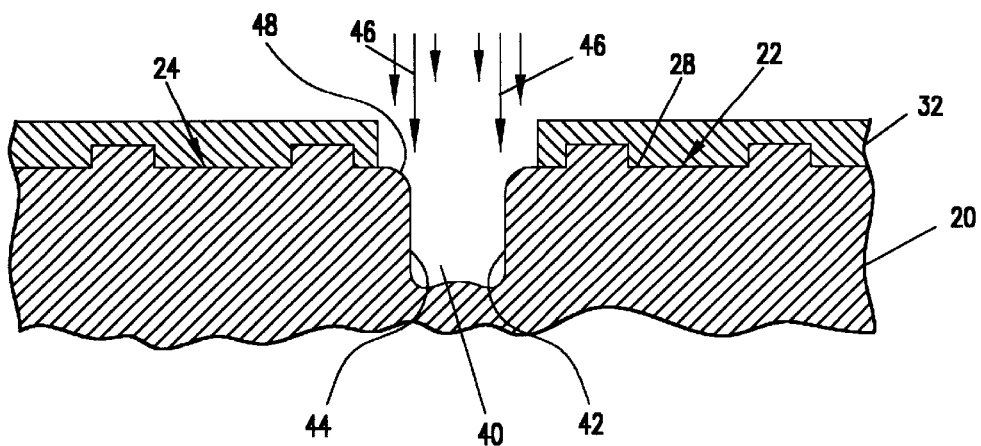

As shown in FIG. 5, laser beam 46 is directed normal to surface 28, centered contiguous to side surfaces 42 and 44 of channel 40. Laser beam 46 is moved or transported in a direction along the length of the edge joining the bottom and side surfaces so that the center of beam 46 is contiguous the respective side surface 42 or 44 along its entire length between the leading and trailing edges of the slider.

In preferred embodiments, laser beam 46 exhibits a Gaussian power distribution that concentrates maximum laser power at the center of the beam with reduced power at locations radially displaced from beam center in accordance with known Gaussian distribution patterns. While a Gaussian power distribution pattern is preferred, other power distribution patterns may be employed that provide a non-linear power distribution profile between a central portion of the beam to the fringe. As the beam center moves along a path contiguous to the side surface 42 or 44, the beam center passes along the entire surface 42 or 44. The fringe of the beam from side surface 42 or 44 receives lower laser power due to the Gaussian power distribution pattern. The laser beam ablates the slider material and the photoresist protecting regions of the slider remote from channel 40. The amount of ablation at a given location is directly related to the strength of the laser beam at that location, which is based on the focus of the laser beam, and the path taken by the material ablated from the slider. The reduced power at the fringes due to the laser beam focus creates surfaces 48 that extend as a continuous curve from sides 42 and 44 to surface 28. Since the Gaussian power distribution provides power that decreases substantially exponentially to the fringe of the beam, the curve of surfaces 48 closely approximates a quarter cylinder between surface 28 and the respective surface 42 or 44.

One feature of the process is that the alignment of the laser beam is inherently tolerant due to the width of the laser beam and the ablation characteristics of the material, including the material ablation threshold. More particularly, the geometry of the open edges between bottom surface 28 and sides 42 and 44 permits an open ablation path so that the material will more easily ablate (vaporize) and expel from the slider at the open edges, as compared to a horizontal surface, thereby creating a margin of tolerance for alignment of the laser beam. Hence, the laser beam need not be absolutely normal to surface 28, nor absolutely contiguous to surfaces 42 and 44. Instead, the laser beam need only be substantially normal to surface 28 and substantially contiguous to surfaces 42 and 44.

Figure 6:
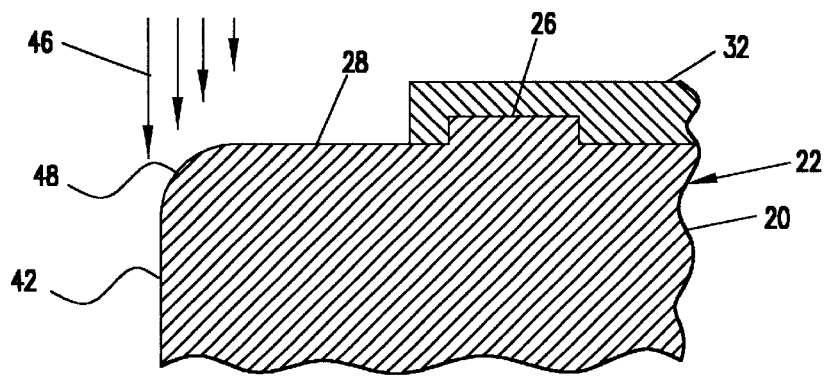

The Gaussian distribution of the power applies the greatest energy at the center of the beam at sides 42 and 44 and the least energy at the outer fringes of the beam. The resulting curved surfaces 48 are tangent to side surfaces 42 and 44 and are tangent to bottom surface 28. The focus of the laser beam results in reduced laser power at the fringes of the beam, resulting in the tangential feature between curved surface 48 the respective side surface 42 and 44, and between curved surface 48 and bottom surface 28. Moreover, the clear ablation path to expel ablated material from the slider aids in the tangential geometry between surface 48 and bottom surface 28. Although beams 46 are centered at side surfaces 42 and 44 to extend the sides of channel 40 more deeply into the slider material, the channel will be removed in a later step anyway. FIG. 6, which is an exploded view of a portion of FIG. 5, illustrates the resulting tangential junction between surface 48 and surface 28 and the tangential junction between surface 48 and the respective surface 42 and 44. Thus, surface 48 forms a tangent-to-tangent continuous curve between surfaces 28 and 42 or 44. The Gaussian power distribution of laser beam 46 assures formation of a smooth curved surface 48 tangent to surfaces 28 and to the respective surface 42 and 44. The location of tangency between surfaces 28 and 48 is dependent on the power level of laser beam 46, which is in part dependent on beam focus, the duration of application of the laser beam, the frequency of the beam, temperature, ventilation, purge gas and other process factors, including the specific nature of the material being ablated. Typically, the process produces curved edges having a radius of about 15 microns, so the location of tangency of surface 48 to bottom surface 28 is about 15 microns from the respective surface 42 or 44, and the location of tangency of surface 48 to side surface 42 or 44 is about 15 microns from surface 28.

Figure 7:
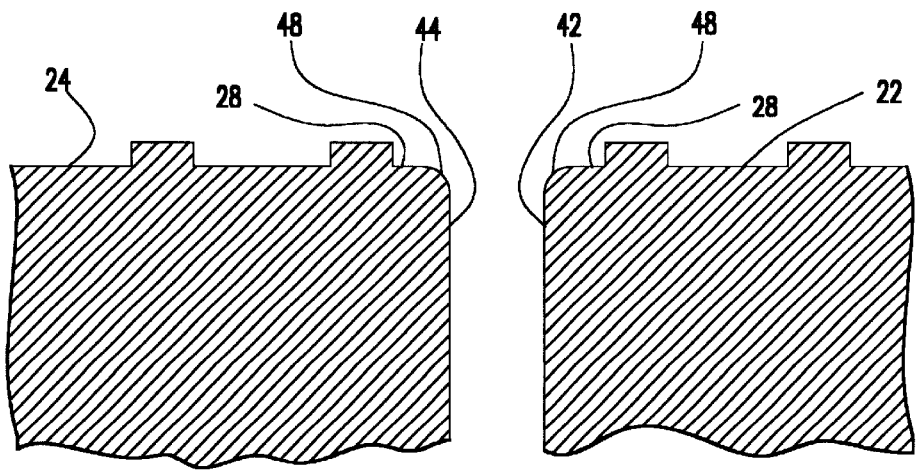

After the curved surface 48 is formed, a diamond blade saw may be used to complete dicing the slider bar to thereby fully separate sliders 22 and 24, as illustrated at 50 in FIG. 7.

FIG. 3 illustrates forming scribe line 40 using a cutting saw or dicing wheel. Alternatively, scribe line 40 may be formed with laser beam 46 to simultaneously form the scribe line and round the edges between bottom surface 28 and side surfaces 42 and 44 as shown in FIG. 5. In this case, the laser beam will ablate the material of the slider and of the photoresist to form the curved surface tangential to surface 28.

The same process described in FIGS. 2–6 may be applied to the edge between the bottom surface 28 and trailing surface of the sliders, thereby forming continuous curved surfaces between the bottom and trailing surfaces. A spherical corner surface may be formed at the junction between the curved surfaces formed between bottom surface 28, side surfaces 42 or 44 and the trailing surface. This spherical surface tangentially joins bottom surface 28 and tangentially joins the curved surfaces 48 along both edges between the bottom and side surfaces and the bottom and trailing surfaces. Conveniently, the spherical corner surface is formed by simply moving laser beam 46 along the full length of one surface (e.g., the side surface), past the junction with the other surface (e.g., the trailing surface), to form curved surface 48 between the bottom surface and the one surface (e.g., the side surface). Laser beam 46 is then moved along the full length of the other surface (e.g., the trailing surface), past the junction with the one surface (e.g., the side surface), to form curved surface 48 between the bottom surface and the other surface (e.g., the trailing surface). The process is repeated to form curved edge surfaces between the sides and the leading and trailing surfaces, between the leading surface and the bottom surface, and between the top surface and the side, trailing and leading surfaces, as may be desired. When forming corners, it is preferred that the movement of the laser beam along the one and other surfaces be at right angles at the corners to avoid ablating too much material at the corners. Typically, an L-shaped or clover-leaf movement pattern may be used to achieve adequate results.

Figure 2:
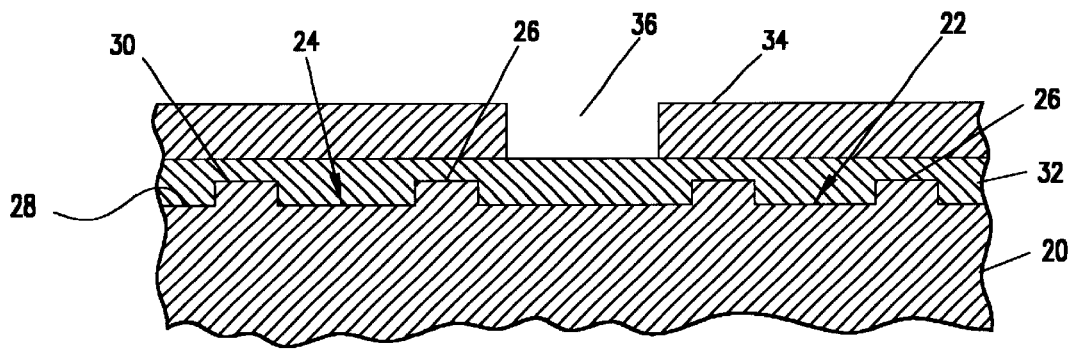
FIGS. 2–7 illustrate a process for rounding edges of a slider using laser ablation in accordance with a first embodiment of the present invention.
Figure 8:
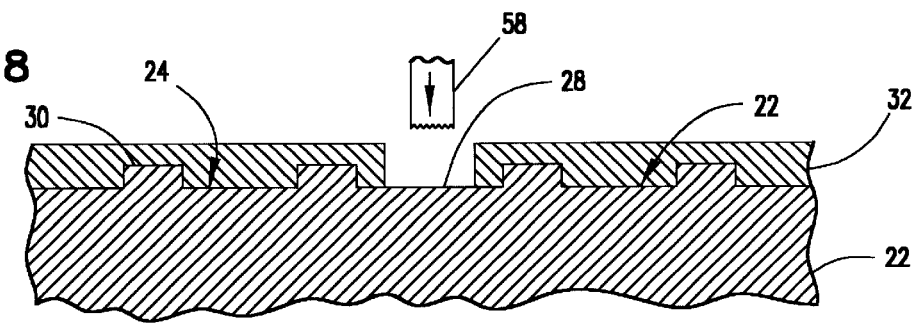
FIGS. 8–10 illustrate the process for rounding edges of a slider in accordance with a second embodiment of the present invention.
Figure 9:
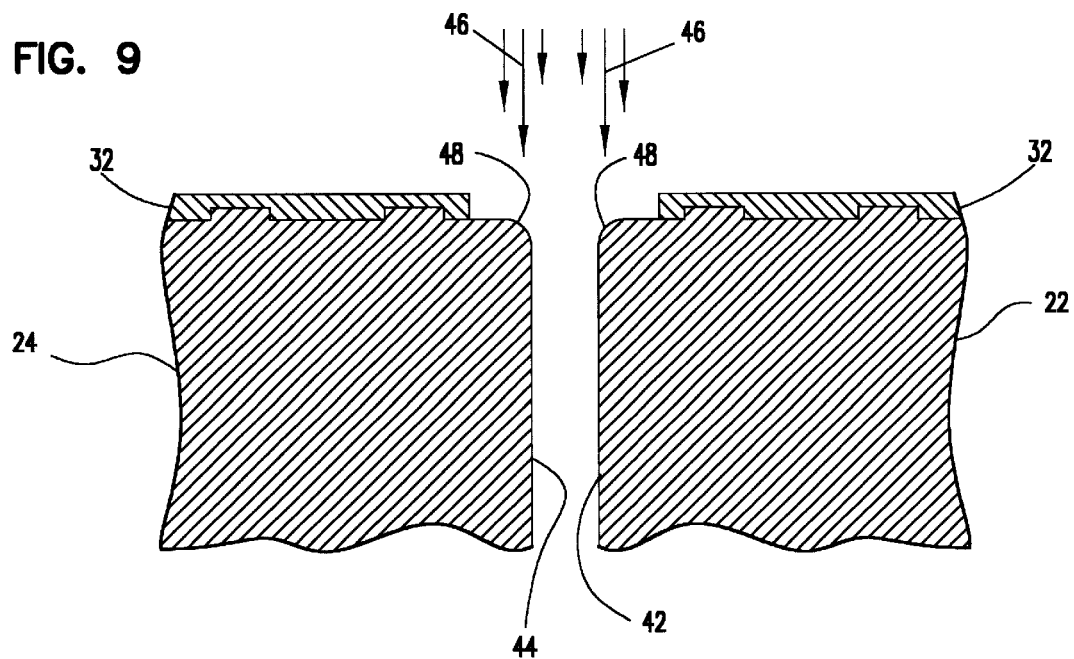
Figure 10:
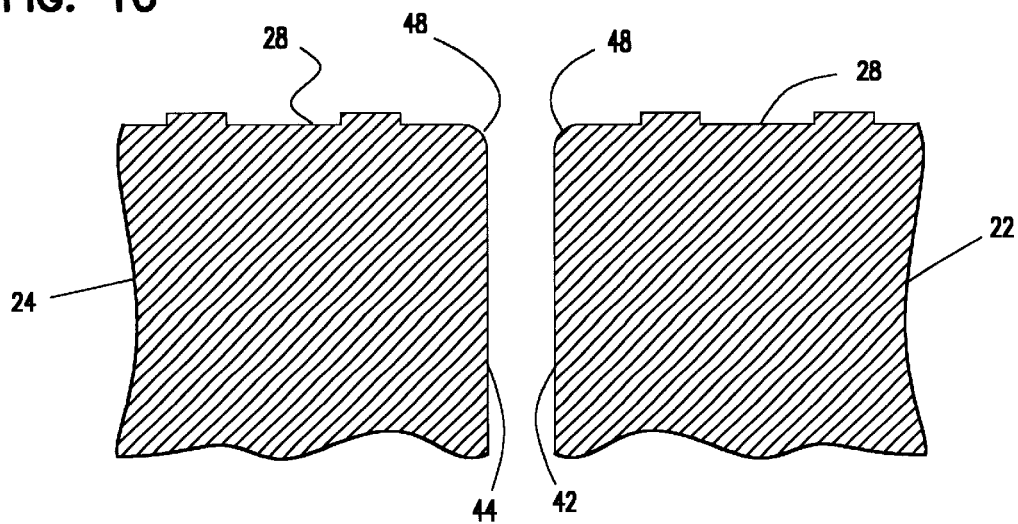

In a second embodiment of the invention, illustrated in FIGS. 8–10, the photoresist layer 32 is patterned in a manner similar to that shown in FIG. 2, except that the light transparent region 36 is wider than the dice lane between sliders. As shown in FIG. 8, the bars are diced with a cutting saw 58, forming side surfaces 42 and 44 for each slider 22 and 24. Thereupon, as shown in FIG. 9, laser beam 46 is centered on the side surface to ablate the slider material, forming curved surface 48 tangentially joining surfaces 28 and the respective side surface 42 or 44, as describe in connection with FIG. 6. The result, shown in FIG. 10 is a slider with curved edge surfaces between the bottom and side surfaces, as described in connection with FIG. 7.

Figure 11:
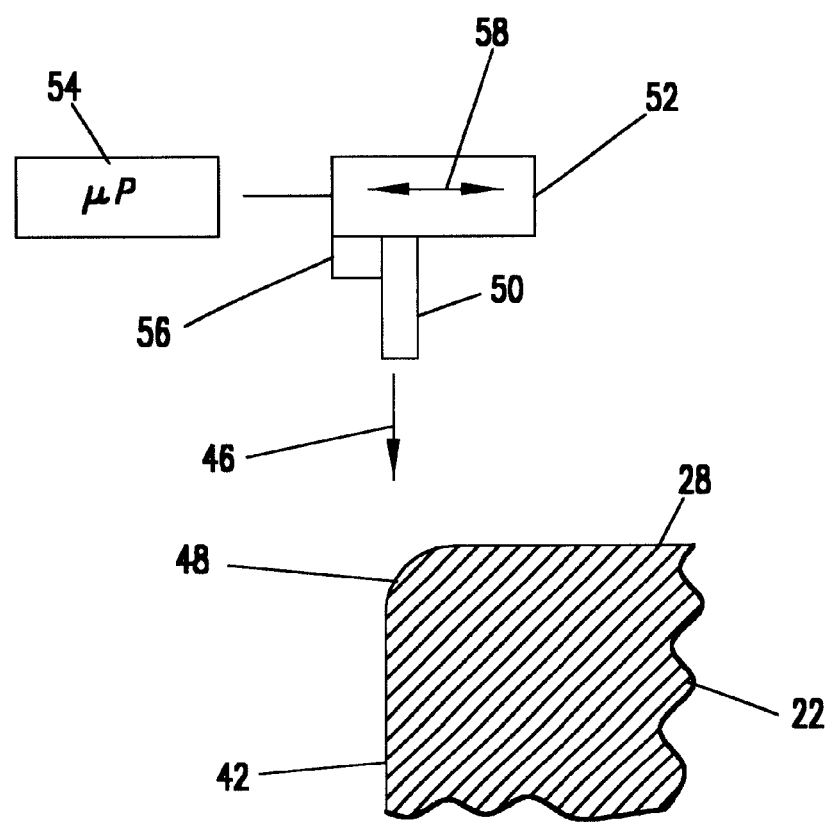
FIG. 11 illustrates apparatus for carrying out the process of the present invention.

FIG. 11 illustrates apparatus for forming the curved edge surface 48 of slider 22. Laser gun 50 is mounted to a movable mount or transport 52, whose position is controlled by microprocessor 54. Microprocessor 54 contains a computer usable medium, such as a disc drive, containing a program code readable by the microprocessor to cause the microprocessor to aim laser gun 50 in a direction normal to surface 28 of sliders 22 and 24. Laser gun 50 or transport 52 may include a positioning device 56 to provide data to microprocessor 54 so that the microprocessor positions laser gun 50 so that the laser beam is contiguous to surface 42. Conveniently, positioning device 56 may be any of several wellknown devices, such as an optical proximity sensor, X-Y plotter, or other device that positions the laser gun relative to surface 42. The program controls microprocessor 54 to move the laser gun in a direction parallel to surface 42 and controls the power of laser 50, and the rate of movement of mount 52 in the direction of arrow 58, to achieve the smooth curved surface 48 on slider 22. The laser beam breaks down and vaporizes (ablates) the crystalline material of slider 22, forming the smooth curved surface 48.

A suitable laser gun 50, transport 52, and positioning device 56 shown in FIG. 11 for carrying out the present invention are commercially available from ElectroScientific Industries of Portland, Oreg. as model 4420. This apparatus includes an internal microprocessor 54 that contains software that causes the microprocessor to operate the laser gun and transport under control of the operator. One embodiment of the present invention comprises software stored in the memory of the microprocessor that causes the microprocessor to control operation of the standard software to select operating levels for laser gun 50, to aim the laser gun and to selectively operate transport 52 to transport the laser gun in accordance with the present invention. More particularly, the present invention provides computer readable program code that causes the computer to select operating parameters for the laser gun and transport and to perform those parameters using the commercial software that operates the laser gun and transport.

Tests performed on the process reveals evenly rounded corners at the junctions of the surfaces to which the process is applied. Because the ablation process is applied to edges of surfaces joined at 90°, the ablated material is free to be quickly removed, and is not re-deposited at locations adjacent the edge. Consequently, the process is quite efficient and results in a clean, smooth curved surface at the edges.

Figure 12:
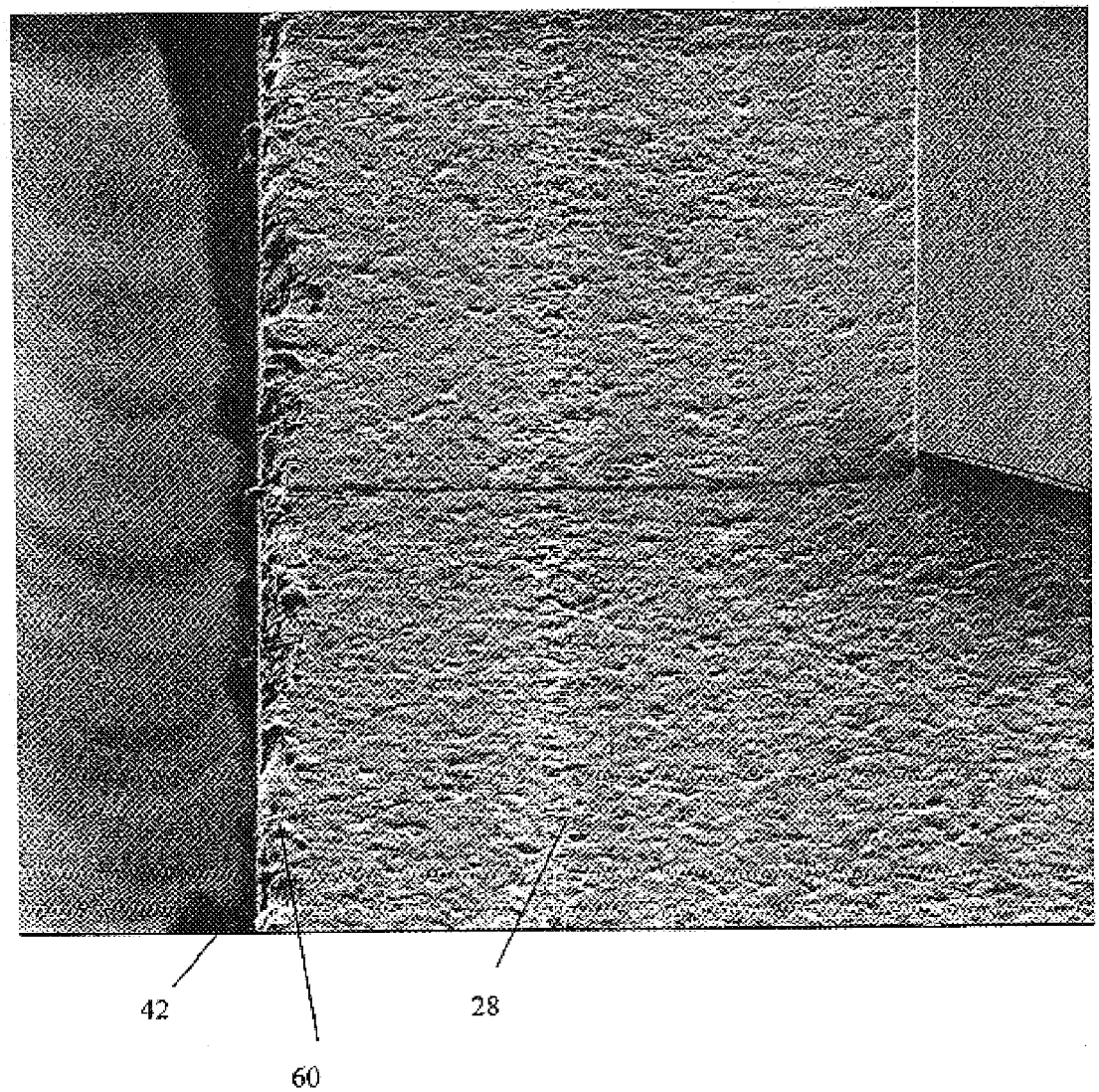
FIGS. 12–14 are microphotographs useful in demonstrating the advantages of the present invention.
Figure 13:
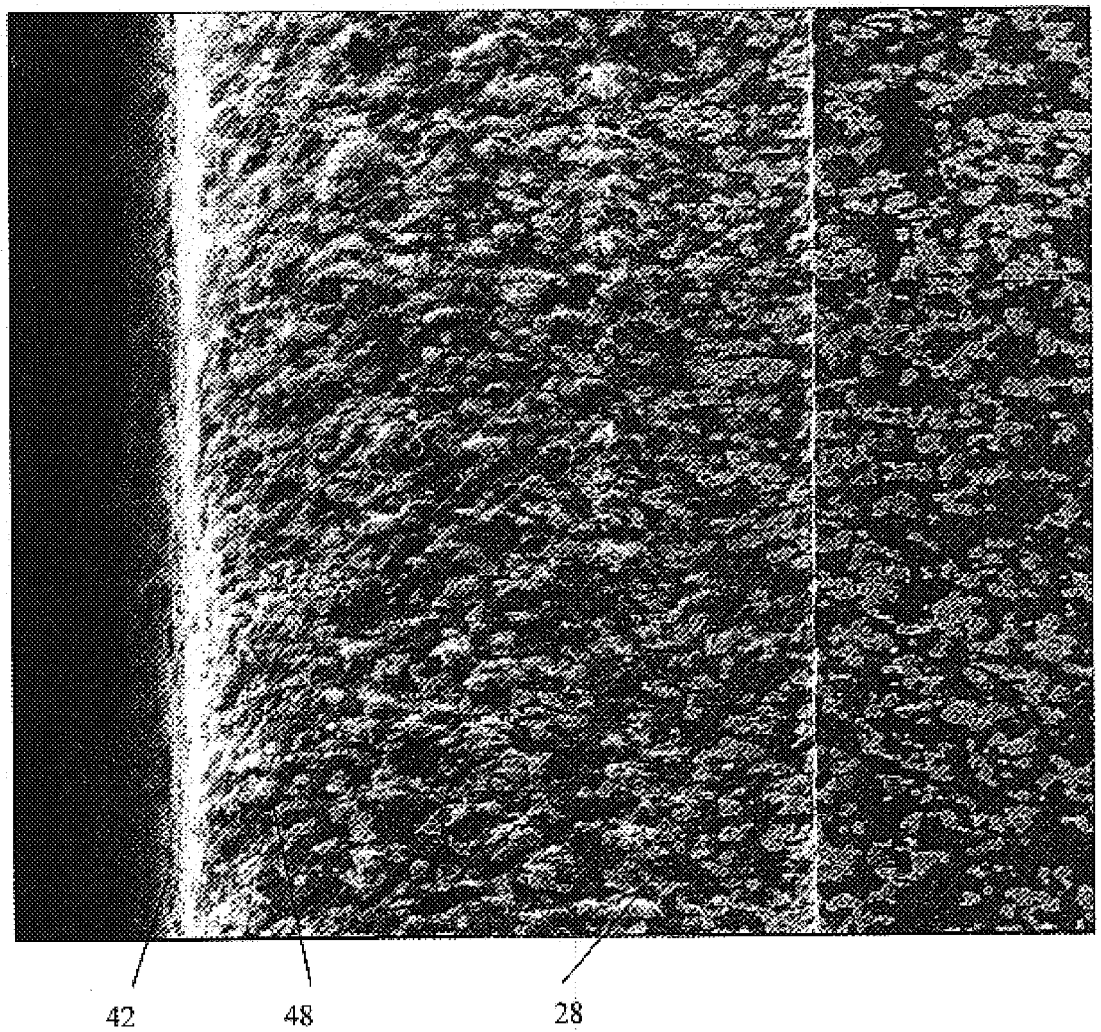
Figure 14:
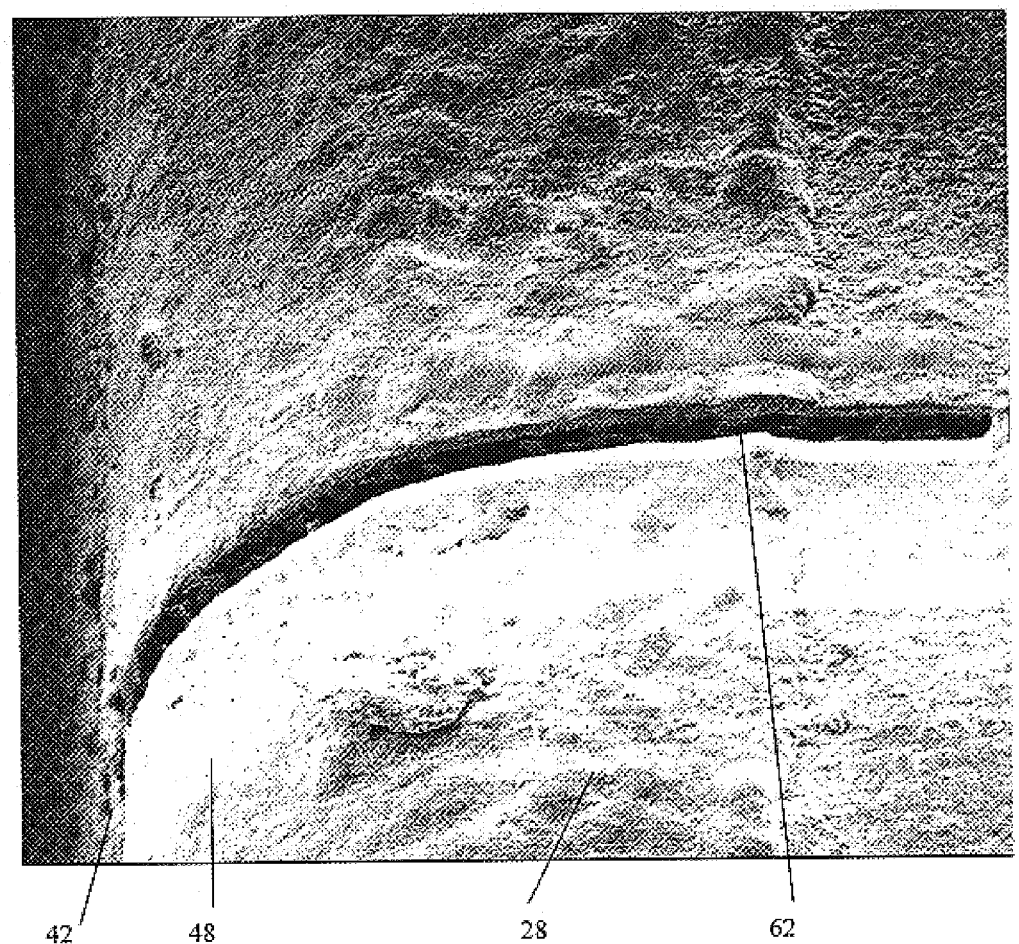

FIGS. 12–14 illustrate the effects of the present invention. More particularly, FIG. 12 is a microphotograph, at a magnitude of about 5,000×, taken at a slight angle to the bottom surface 28 and normal to the side surface 42 of a slider, illustrating a rough edge 60 between the nominal bottom surface 28 and side surface 42 of the slider. FIGS. 13 and 14 are microphotographs, also at about 5,000×, taken from the same angle as FIG. 12, showing edge 60 after laser ablation in accordance with the present invention. In FIG. 14, the slider has been coated with a distinctive coating and the coating has been scored to form groove 62 in the coating for purposes of illustrating the continuous curve of surface 48 between side surface 42 and bottom surface 28.

The invention provides a process of forming a curved surface 48 between a first 28 and second 42 substantially planar and substantially normal surfaces. A laser beam 46 has a center and a power distribution such that the laser power is greatest at the center of the beam and is weaker radially from the center of the beam. The laser beam is directed at the first surface 28 along a first path substantially normal to the first surface so that the center of the laser beam is contiguous the second surface 42. The laser beam is moved along a second path substantially parallel to the second surface to ablate the object at the first surface adjacent the second surface to thereby form a continuous curved surface 48 between the first and second surfaces 28 and 42 and tangentially joined to at least one of surfaces 28 and 42.

The invention also provides a computer readable medium containing a computer readable program that includes code that causes the computer to carry out the process of the invention.

The present invention also provides an aerodynamic slider having a substantially planar bottom surface 28 and a substantially planar side surface 42, characterized by the inclusion of a continuously curved surface 48 extending between the bottom and side surfaces and tangentially joined to at least one of the bottom and side surfaces.

Although the present invention has been described with reference to laser cutting to form the curved edge surface of the slider, those skilled in the art will recognize that the present invention may be practiced with other technologies, such as ion milling.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, particular elements may vary depending on the particular application for the curved edge and/or corner surface while maintaining substantially the same functionality without departing from the scope and spirit of the present invention. Thus, while the invention is described in connection with the formation of tangent-to-tangent curved surfaces on objects, tangential relationship to one of the planar surfaces joining the curved surface may be accomplished without departing from the scope and spirit of the present invention. For example by simultaneous formation of the scribe line and curved surface by laser treatment, it is possible that the smooth curved surface might not tangentially join surface 42 or 44, yet be tangential to surface 28. Moreover, while the invention is described in connection with the formation of curved surfaces in magnetic head sliders, it will be appreciated by those skilled in the art that the teachings of the present invention can be applied to other devices requiring close tolerances between moving parts, including flying optical heads and various machine parts, without departing from the scope and spirit of the invention.

What is claimed is:

1. A slider comprising a unitary crystalline body, the body having a substantially planar bottom surface and a substantially planar side surface, the side surface being substantially normal to the bottom surface, the body being characterized by the inclusion of a substantially smooth continuously curved convex surface extending between the bottom and side surfaces and tangentially joined to the bottom and side surfaces without misalignment to the bottom and side surfaces.

2. The slider of claim 1, wherein the body further includes a substantially planar trailing surface substantially normal to both the bottom and side surfaces, the body being further characterized by a second substantially smooth continuously curved convex surface extending between and tangentially joined to the bottom and trailing surfaces without misalignment to the bottom and trailing surfaces, and a third substantially smooth continuously curved convex surface between the first-named and second curved surfaces and tangentially joined to the bottom, side and trailing surfaces without misalignment to the bottom, side and trailing surfaces.

3. The slider of claim 2, wherein the body further includes a substantially planar leading surface substantially normal to both the bottom and side surfaces, the body being further characterized by a fourth substantially smooth continuously curved convex surface extending between and tangentially joined to the bottom and leading surfaces without misalignment to the bottom and leading surfaces, and a fifth substantially smooth continuously curved convex surface between the first-named and fourth curved surfaces and tangentially joined to the bottom, side and leading surfaces without misalignment to the bottom, side and leading surfaces.

4. The slider of claim 1, wherein the body further includes a substantially planar leading surface substantially normal to both the bottom and side surfaces, the body being further characterized by a second substantially smooth continuously curved convex surface extending between and tangentially joined to the bottom and leading surface without misalignment to the bottom and leading surfaces, and a third substantially smooth continuously curved convex surface between the first-named and second curved surfaces and tangentially joined to the bottom, side and leading surfaces without misalignment to the bottom, side and leading surfaces.

5. A slider comprising a unitary crystalline body supporting a transducer head, the body comprising:
   a substantially planar bottom surface;
   at least one substantially planar side surface substantially normal to the bottom surface; and
   a substantially smooth continuously curved convex surface extending between the bottom and the at least one side surface and tangentially joined to the bottom and the at least one side surfaces without misalignment to the bottom and at least one side surfaces.

6. The slider of claim 5, wherein the body further includes:
   a substantially planar trailing surface substantially normal to both the bottom and side surfaces,
   a second substantially smooth continuously curved convex surface extending between and tangentially joined to the bottom and trailing surfaces without misalignment to the bottom and trailing surfaces, and
   a third substantially smooth continuously curved convex surface between the first-named and second curved surfaces and tangentially joined to the bottom, side and trailing surfaces without misalignment to the bottom, side and trailing surfaces.

7. The slider of claim 6, wherein the body further includes:
   a substantially planar leading surface substantially normal to both the bottom and side surfaces,
   a fourth substantially smooth continuously curved convex surface extending between and tangentially joined to the bottom and leading surfaces without misalignment to the bottom and leading surfaces, and
   a fifth substantially smooth continuously curved convex surface between the first-named and fourth curved surfaces and tangentially joined to the bottom, side and leading surfaces without misalignment to the bottom, side and leading surfaces.

8. The slider of claim 5, wherein the body further includes:
   a substantially planar leading surface substantially normal to both the bottom and side surfaces,
   a second substantially smooth continuously curved convex surface extending between and tangentially joined to the bottom and leading surfaces without misalignment to the bottom and leading surfaces, and
   a third substantially smooth continuously curved convex surface between the first-named and second curved surfaces and tangentially joined to the bottom, side and leading surfaces without misalignment to the bottom, side and leading surfaces.

9. The slider of claim 5, wherein the body further includes:
   a second side surface substantially normal to the bottom surface and substantially parallel to the first-named side surface, and
   a second substantially smooth continuously curved convex surface extending between the bottom surface and the second side surface and tangentially joined to the bottom surface and the second side surface without misalignment to the bottom and second side surfaces.

10. The slider of claim 9, wherein the body further includes:
    a substantially planar trailing surface substantially normal to both the bottom and side surfaces,
    a third substantially smooth continuously curved convex surface extending between and tangentially joined to the bottom and trailing surfaces without misalignment to the bottom and trailing surfaces,
    a fourth substantially smooth continuously curved convex surface between the first and third curved surfaces and tangentially joined to the bottom, first side and trailing surfaces without misalignment to the bottom, first side and trailing surfaces, and
    a fifth substantially smooth continuously curved convex surface between the second and third curved surfaces and tangentially joined to the bottom, second side and trailing surfaces without misalignment to the bottom, second side and trailing surfaces.

11. The slider of claim 10, wherein the body further includes:
    a substantially planar leading surface substantially normal to both the bottom and side surfaces,
    a sixth substantially smooth continuously curved convex surface extending between and tangentially joined to the bottom and leading surfaces without misalignment to the bottom and leading surfaces,
    a seventh substantially smooth continuously curved convex surface between the first and sixth curved surfaces and tangentially joined to the bottom, first side and leading surfaces without misalignment to the bottom, first side and leading surfaces, and
    an eighth substantially smooth continuously curved convex surface between the second and sixth curved surfaces and tangentially joined to the bottom, second side and leading surfaces without misalignment to the bottom, second side and leading surfaces.

12. The slider of claim 9, wherein the body further includes:
    a substantially planar leading surface substantially normal to both the bottom and side surfaces,
    a third substantially smooth continuously curved convex surface extending between and tangentially joined to the bottom and leading surface without misalignment to the bottom and leading surfaces,
    a fourth substantially smooth continuously curved convex surface between the first and third curved surfaces and tangentially joined to the bottom, first side and leading surfaces without misalignment to the bottom, first side and leading surfaces, and
    a fifth substantially smooth continuously curved surface between the second and third curved surfaces and tangentially joined to the bottom, second side and leading surfaces without misalignment to the bottom, second side and leading surfaces.

13. A slider comprising a unitary crystalline body having a leading surface, first and second side surfaces, a trailing surface and a substantially planar air-bearing surface substantially normal to each of the leading, first side, second side and trailing surfaces, and a transducer head supported by the slider, the body including:
    a first substantially smooth continuously curved convex surface extending between the air-bearing and the first side surface and tangentially joined to the air-bearing and the first side surfaces without misalignment to the air-bearing and first side surfaces.

14. The slider of claim 13, wherein the body further comprises:

a second substantially smooth continuously curved convex surface extending between and tangentially joined to the air-bearing and trailing surfaces without misalignment to the air-bearing and trailing surfaces, and a third substantially smooth continuously curved convex surface between the first and second curved surfaces and tangentially joined to the air-bearing, first side and trailing surfaces without misalignment to the air-bearing, first side and trailing surfaces.

15. The slider of claim 14, wherein the body further comprises:

a fourth substantially smooth continuously curved convex surface extending between and tangentially joined to the air-bearing and leading surfaces without misalignment to the air-bearing and leading surfaces, and a fifth substantially smooth continuously curved convex surface between the first and fourth curved surfaces and tangentially joined to the air-bearing, first side and leading surfaces without misalignment to the air-bearing, first side and leading surfaces.

16. The slider of claim 13, wherein the body further comprises:

a second substantially smooth continuously curved convex surface extending between and tangentially joined to the air-bearing and leading surface without misalignment to the air-bearing and leading surfaces, and a third substantially smooth continuously curved convex surface between the first and second curved surfaces and tangentially joined to the air-bearing, first side and leading surfaces without misalignment to the air-bearing, first side and leading surfaces.

17. The slider of claim 13, wherein the body further comprises:

a second substantially smooth continuously curved convex surface extending between the air-bearing and the second side surfaces and tangentially joined to the air-bearing and the second side surface without misalignment to the air-bearing and second side surfaces.

18. The slider of claim 17, wherein the body further comprises:

a third substantially smooth continuously curved convex surface extending between and tangentially joined to the air-bearing and trailing surfaces without misalignment to the air-bearing and trailing surfaces, a fourth substantially smooth continuously curved convex surface between the first and third curved surfaces and tangentially joined to the air-bearing, first side and trailing surfaces without misalignment to the air-bearing, first side and trailing surfaces, and a fifth substantially smooth continuously curved convex surface between the second and third curved surfaces and tangentially joined to the air-bearing, second side and trailing surfaces without misalignment to the air-bearing, second side and trailing surfaces.

19. The slider of claim 18, wherein the body further comprises:

a sixth substantially smooth continuously curved convex surface extending between and tangentially joined to the air-bearing and leading surfaces without misalignment to the air-bearing and leading surfaces, a seventh substantially smooth continuously curved convex surface between the first and sixth curved surfaces and tangentially joined to the air-bearing, first side and leading surfaces without misalignment to the air-bearing, first side and leading surfaces, and an eighth substantially smooth continuously curved convex surface between the second and sixth curved surfaces and tangentially joined to the air-bearing, second side and leading surfaces without misalignment to the air-bearing, second side and leading surfaces.

20. The slider of claim 17, wherein the body further comprises:

a third substantially smooth continuously curved convex surface extending between and tangentially joined to the air-bearing and leading surface without misalignment to the air-bearing and leading surfaces, a fourth substantially smooth continuously curved convex surface between the first and third curved surfaces and tangentially joined to the air-bearing, first side and leading surfaces without misalignment to the air-bearing, first side and leading surfaces, and a fifth substantially smooth continuously curved convex surface between the second and third curved surfaces and tangentially joined to the air-bearing, second side and leading surfaces without misalignment to the air-bearing, second side and leading surfaces.

* * * * *

UNITED STATES PATENT AND TRADEMARK OFFICE
CERTIFICATE OF CORRECTION

PATENT NO. : 6,804,086 B2
DATED : October 12, 2004
INVENTOR(S) : Gordon M. Jones It is certified that error appears in the above-identified patent and that said Letters Patent is hereby corrected as shown below:

<u>Title page,</u>
Insert Item -- [73] Assignee:     Seagate Technology LLC
                                   Scotts Valley, CA --.

Signed and Sealed this

Twenty-seventh Day of December, 2005

JON W. DUDAS
*Director of the United States Patent and Trademark Office*